C. W. STEELE.
TIRE STRIPPING MACHINE.
APPLICATION FILED OCT. 31, 1917.
1,258,716.
Patented Mar. 12, 1918.
2 SHEETS—SHEET 2.
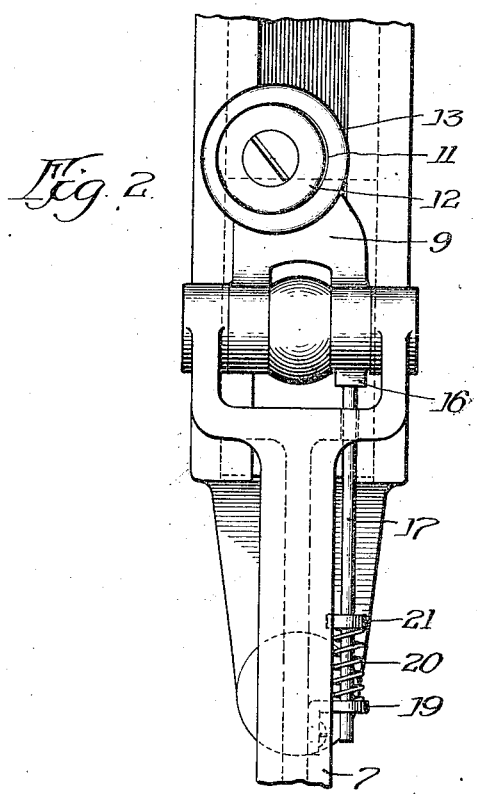
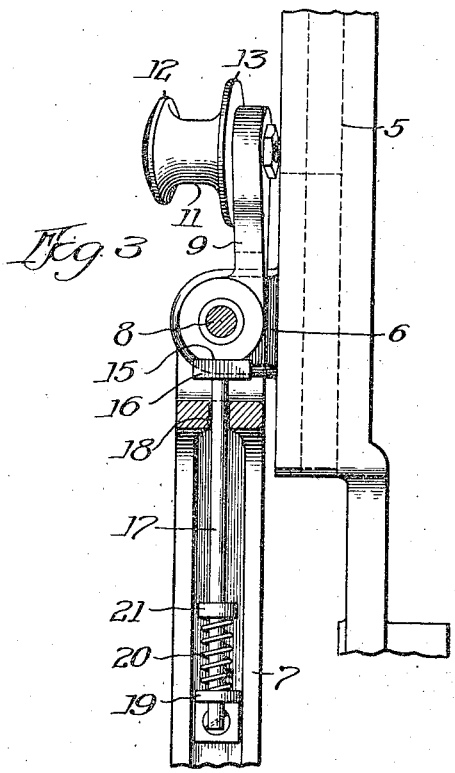
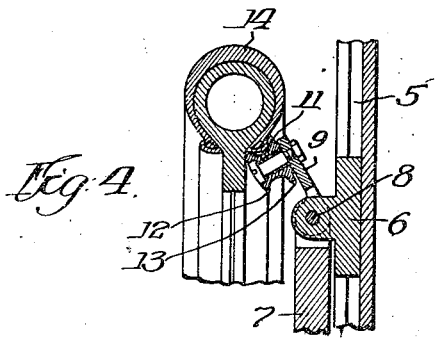
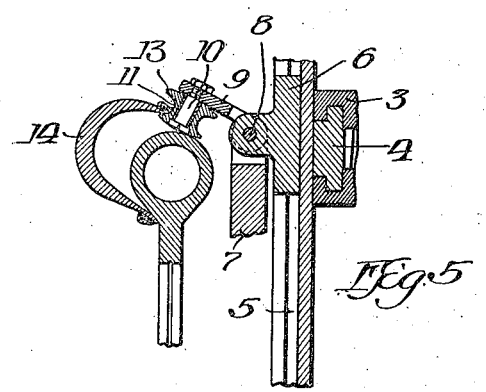
Witness
Inventor:
Charles W. Steele,
By C. L. Ely Atty

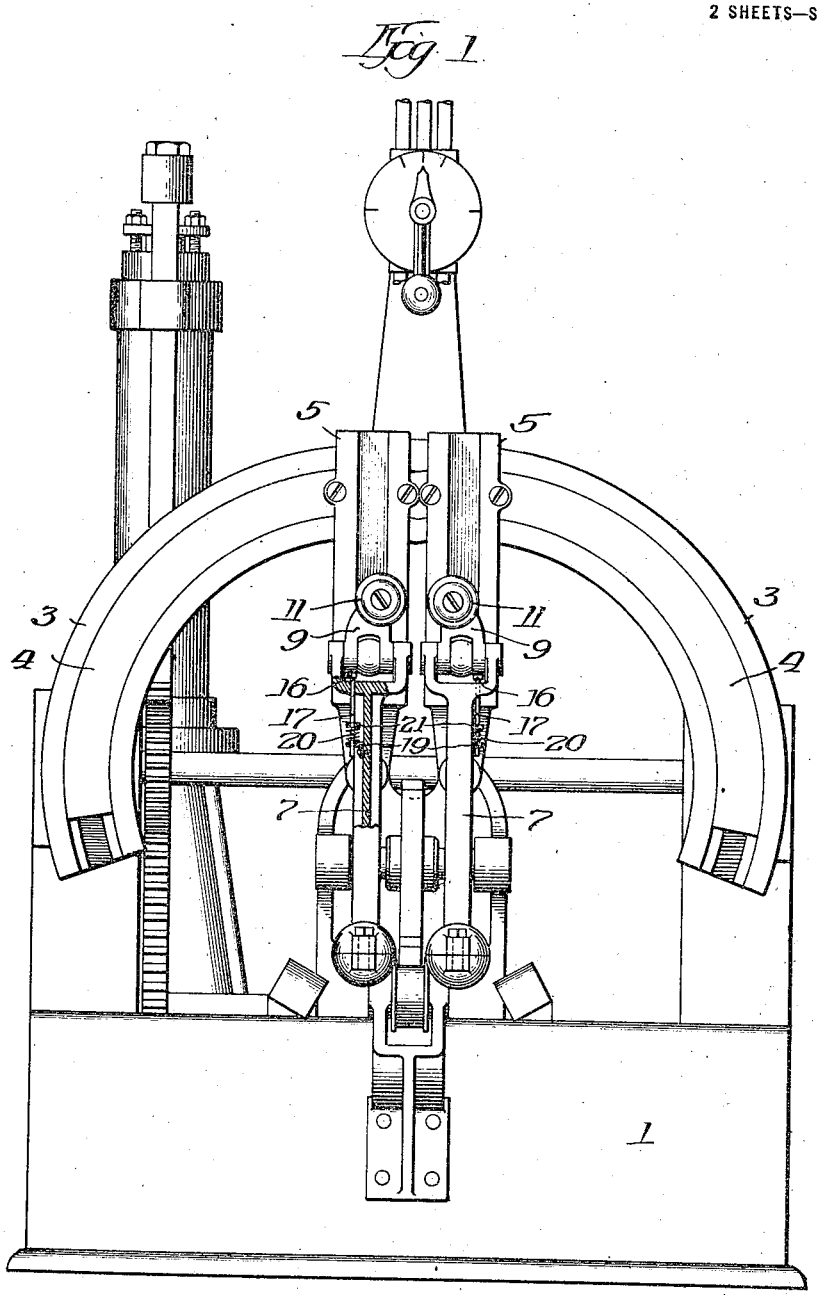

UNITED STATES PATENT OFFICE.

CHARLES W. STEELE, OF AKRON, OHIO, ASSIGNOR TO THE FIRESTONE TIRE & RUBBER COMPANY, OF AKRON, OHIO, A CORPORATION OF OHIO.

TIRE-STRIPPING MACHINE.

1,258,716.  Specification of Letters Patent.  Patented Mar. 12, 1918.

Application filed October 31, 1917. Serial No. 199,596.

*To all whom it may concern:*

Be it known that I, CHARLES W. STEELE, a citizen of the United States, residing at Akron, in the county of Summit, State of Ohio, have invented certain new and useful Improvements in Tire - Stripping Machines, of which the following is a specification.

It has been the purpose of this invention to improve upon the machine for stripping tires invented by William C. Stevens, Patent No. 1,211,256, January 2, 1917, to which reference should be made for a further understanding of the invention. The particular object of this invention is to improve the tire stripping finger, that is, the element of the machine which contacts the tire and raises and stretches the bead over the core.

In the drawing accompanying this application there is shown one form of the invention, although it is obvious that changes and modifications may be made in the particular form of the device.

Figure 1 is a front elevation of the machine embodying the invention of Stevens as set forth above, with my improved tire removing attachment mounted thereon.

Fig. 2 is an enlarged front elevation of the end of the tire stripping arm.

Fig. 3 is a side elevation.

Fig. 4 is a detail showing the manner in which the tire stripping member engages the bead of the tire prior to its radial movement, and Fig. 5 is a detail showing the position of the tire stripping member in its peripheral movement about the core.

A brief description of the operation of the machine as a whole will make clearer the manner in which my improvement is intended to remove the tire. The machine comprises a base 1 to the upper surface of which is attached two arc-shaped guide rails 3 in which are mounted two arc-shaped slides 4. To the ends of the slides are attached radial guideways 5 in which are reciprocally mounted shoes 6 carried at the ends of radial arms 7. Means are provided in the machine for moving the arm 7, first radially of the core, which has been clamped in position by suitable mechanism, not shown, and then circumferentially. The radial movement is imparted to the tire-stripping elements by suitable gearing, and the circumferential movement is imparted by sliding of the parts 4 in the guideways 3, the sliding of the parts 4 being accomplished by suitable gearing.

The end of each arm 7 is pivotally connected to the shoe 6 by a pin 8, which carries an arm 9 mounted for rotary movement about the pin 8. In the outer end of the arm 9 is secured a pin 10 which projects outwardly from the arm and carries a roller 11. This roller constitutes the tire engaging member and is one of the specific improvements made on the Stevens tire stripping machine. It is provided with a concave periphery bounded by two circumferential flanges 12 and 13, the front flange 12 being slightly lower than the rear flange 13. By reference to Figs. 4 and 5 it will be noted that the roller 11 is of a contour such that the concave periphery will surround the bead of the tire 14 and hold it effectively while stretching it radially, without the possibility of injuring the tire.

On the lower part of the arm 9 there is formed a flattened portion 15 against which bears on a detent for shoe 16 carried on the upper end of a pin 17. The pin 17 is slidably mounted in an aperture 18 at the upper end of the arm 7 and in a bracket 19 on the arm. A light coil spring 20 surrounds the pin 17, being held at one end by the bracket 19 and at the other by a collar 21 secured to the pin. By means of the spring and rod the arm 9 carrying the rollers is normally held in upright position so as to properly engage the bead of the tire, but is allowed to rock on its pivot pin 8 as the shoe 6 is advanced radially of the core.

The operation of the improved stripping element will be readily understood and it is apparent that by this means the tire may be more effectively grasped and removed without liability of injury.

I claim:

1. A device for removing tires from cores, comprising a tire removing element, and a roller carried on said element adapted to contact the lowermost edge or bead of the tire.

2. A machine for removing tires from cores, comprising a movably mounted arm, a roller on the end of said arm, said roller adapted to contact with the bead of the tire, and means to move said arm to cause said roller to stretch the bead of the tire and force it off the core.

3. A machine for removing tires from cores, comprising a movably mounted arm, means at the end of said arm adapted to having rolling contact with the bead of the tire, in combination with mechanism to move said arm radially and circumferentially of the core to strip the tire therefrom.

4. A machine for removing tires from cores, comprising a movably mounted arm, a roller at the end of said arm, said roller having a concave periphery adapted to receive the bead of the tire, in combination with mechanism to move said arm radially and circumferentially of the core to strip the tire therefrom.

5. A machine for removing tires from cores, comprising an arm adapted to move in a plane parallel to the plane of the core, a rocker arm at the end of said first-mentioned arm, a tire contacting member at the end of said arm, and yieldable means adapted to hold said rocker arm in position.

6. A machine for removing tires from cores, comprising a movably mounted arm, a rocker arm pivotally mounted at the end of said first-mentioned arm, a tire contacting member at the end of said rocker arm, mechanism to move said first mentioned arm to strip the tire from the core, and yieldable means adapted to hold said rocker arm in one position but permitting it to move about its pivot while the first mentioned arm is operated to strip the tire from the core.

7. A machine for removing tires from cores, comprising a movably mounted arm, a rocker arm pivotally mounted at the end of said first mentioned arm, a tire contacting member at the end of said rocker arm, mechanism to move said first mentioned arm to strip the tire from the core, and a spring held detent adapted to hold said rocker arm in one position but permitting it to move about its pivot while the first mentioned arm is operated to strip the tire from the core.

CHARLES W. STEELE.